(12) United States Patent
Matsumoto (10) Patent No.: US 7,656,616 B2
(45) Date of Patent: Feb. 2, 2010

(54) MAGNETIC HEAD DEVICE HAVING SLIDER AND MAGNETIC FUNCTION UNIT

(75) Inventor: Tsuyoshi Matsumoto, Niigata-ken (JP)

(73) Assignee: TDK Corporation, Tokyo (JP)

( * ) Notice: Subject to any disclaimer, the term of this patent is extended or adjusted under 35 U.S.C. 154(b) by 468 days.

(21) Appl. No.: 11/506,020

(22) Filed: Aug. 17, 2006

(65) Prior Publication Data

US 2007/0047145 A1 Mar. 1, 2007

(30) Foreign Application Priority Data

Sep. 1, 2005 (JP) ............................. 2005-252939

(51) Int. Cl.
*G11B 5/60* (2006.01)
*G11B 21/21* (2006.01)
(52) U.S. Cl. ................. 360/235.7; 360/236.5
(58) Field of Classification Search ............. 360/235.4, 360/235.5, 235.7, 236.1, 236.2, 236.3, 236.5, 360/236.9, 237
See application file for complete search history.

(56) References Cited

U.S. PATENT DOCUMENTS

| 6,021,020 | A | 2/2000 | Itoh et al. | |
|---|---|---|---|---|
| 6,707,631 | B1* | 3/2004 | Haddock | 360/75 |
| 7,095,592 | B2* | 8/2006 | Ueno et al. | 360/236 |
| 7,193,805 | B1* | 3/2007 | Haddock | 360/75 |
| 7,245,457 | B2* | 7/2007 | Kuroki et al. | 360/244.2 |
| 2001/0030834 | A1* | 10/2001 | Kohira et al. | 360/235.8 |
| 2002/0041467 | A1* | 4/2002 | Boutaghou et al. | 360/236.1 |
| 2003/0123191 | A1* | 7/2003 | Kasamatsu et al. | 360/235.8 |
| 2003/0133227 | A1* | 7/2003 | Anan et al. | 360/236.3 |
| 2003/0184915 | A1* | 10/2003 | Kameyama et al. | 360/235.8 |
| 2003/0193750 | A1* | 10/2003 | Kohira et al. | 360/236.3 |
| 2003/0197979 | A1* | 10/2003 | Kohira et al. | 360/236.3 |
| 2004/0212930 | A1* | 10/2004 | Kohira et al. | 360/235.8 |
| 2004/0233580 | A1* | 11/2004 | Yao et al. | 360/235.5 |
| 2005/0207065 | A1* | 9/2005 | Takagi | 360/235.8 |
| 2005/0231852 | A1* | 10/2005 | Tian et al. | 360/235.8 |
| 2005/0254174 | A1* | 11/2005 | Nikitin et al. | 360/235.7 |
| 2005/0270697 | A1* | 12/2005 | Kohira et al. | 360/236.3 |
| 2006/0114611 | A1* | 6/2006 | Zhu et al. | 360/235.7 |

FOREIGN PATENT DOCUMENTS

| CN | 1655241 | 8/2005 |
|---|---|---|
| JP | 10-283622 | 10/1998 |
| JP | 2005-050546 | 2/2005 |
| JP | 2005-228362 | 8/2005 |

OTHER PUBLICATIONS

First Examiner's Opinion for corresponding Chinese Patent Application Serial No. 2006101266559, dated Nov. 2, 2007.
Preliminary Rejection for corresponding Japanese Patent Application Serial No. 2005-252939, dated Aug. 14, 2007.

* cited by examiner

*Primary Examiner*—William J Klimowicz
(74) *Attorney, Agent, or Firm*—Brinks Hofer Gilson & Lione (57) ABSTRACT

A magnetic head device is disclosed. The magnetic head device having a levitation attitude formed by an air stream on a surface thereof when a recording medium moves. A levitation height of a magnetic function unit can be stabilized even when air density of an operating environment is changed. In a middle region of a slider of a magnetic head device, a deep concave bottom portion is provided and a levitation pressure is not substantially generated. The levitation is exerted to a front positive pressure surface located in front of the middle region and a rear positive pressure surface located in the rear of the middle region.

17 Claims, 6 Drawing Sheets

MAGNETIC HEAD DEVICE HAVING SLIDER AND MAGNETIC FUNCTION UNIT

This application claims the benefit of Japanese Patent Application No. 2005-252939 filed on Sep. 1, 2005 which is hereby incorporated by reference.

FIELD

A magnetic head device having slider and magnetic function unit is disclosed.

BACKGROUND

Previously disclosed is a magnetic head device that has a slider that faces a magnetic recording medium and a magnetic function unit provided in an end portion of a ring side of a tray of the slider. The magnetic head device records a magnetic signal in the magnetic recording medium such as a hard disk and reads out the magnetic signal recorded in the magnetic recording medium. The magnetic function unit has a reproducing function unit where an MR effect or a GMR effect is used and a recording function unit where magnetic materials such as a york, a coil and the like are thin-filmed.

The slider of the magnetic head device is suppressed on the surface of the magnetic recording medium by an elastic member such as a load beam, but when the magnetic recording medium rotates, the slider levitated from the magnetic recording medium by an air stream (air pairing) flowing between the surface thereof and the slider, thus predetermined levitation height is set between the magnetic function unit and the magnetic recording medium.

In this type of magnetic head device, a positive pressure surface that generates a levitation pressure by the air stream and a negative pressure generating surface retreats farther than the positive pressure surface are formed on sides of the magnetic recording medium in the slider that faces each other. The slider has an adequate levitation attitude on the surface of the magnetic recording medium by a balance between the levitation pressure exerted on the positive pressure surface and an absorption force to the magnetic recording medium generated on the negative pressure generating surface to stabilize the levitation height.

In order to enhance a magnetic recording density to the magnetic recording medium, and speed-up the recording speed and the reproducing speed, the levitation height from the magnetic function unit is generally set to be lowered as much as possible.

In the magnetic head device according to JP-A-10-283622 (U.S. Pat. No. 6,021,020) described below, in a facing side that faces the magnetic recording medium of the slider, a comparatively deep cratering is formed in an intermediate part of an anterior-posterior direction. The positive pressure surface has a comparatively wide area that is formed at a front part, which is farther than the cratering. The positive pressure surface has a comparatively small area that is formed at a rear part farther than the cratering. This magnetic head device decreases the levitation height by generating the levitation pressure only in a front part and a rear part of the slider without substantially generating the levitation pressure in the middle cratering part.

In the known magnetic head device, the variation of the levitation height that is changed by the air density has a low levitation of the slider. When a levitation distance of the slider is shortened with respect to the magnetic recording medium, the levitation height can be lowered by fluctuating in correspondence with the lowering of the air density based on the altitude difference. When the known magnetic head device is used at high altitudes, such as in an aircraft, the slider can potentially contact the surface of the magnetic recording medium. This increases the possibility that the magnetic recording medium or the magnetic head device rises will be damaged.

In the magnetic head device according to Patent Document 1 described above, the low levitation height is realized by generating the levitation pressure only in the front part and the rear part of the slider. However, in this configuration, when the air density of the operating environment is lowered, the levitation height of the slider is also lowered, thus damage may occur.

SUMMARY

A magnetic head device is disclosed. The magnetic head device, comprises a slider that has a facing side that faces a recording medium and a pressing side that exerts a pressing force on the recording medium. A magnetic function unit is provided in a trailing side of the slider, and performs at least one of a magnetic recording and a magnetic reproducing. The facing of the slider has a front region located in a leading side, a rear region located in the trailing side and a middle region located therebetween. The middle region includes a concave bottom surface that is farther from the recording medium than the front region and the rear region. The front region includes a front positive pressure surface that is the nearest to the recording medium therein. The rear region includes a rear positive pressure surface that is the nearest to the recording medium therein. The rear positive pressure surface is located more frontwards than the magnetic function unit and more rearwards than an exerting point of the pressing force. A retreating surface is provided in a side that is farther from the recording medium than the rear positive pressure surface between the rear positive pressure surface and the magnetic function unit.

In the magnetic head device, when set the levitation height of the magnetic function unit is set to a small value the levitation pressure is not substantially generated in the middle region that has the concave bottom surface in a facing side that faces the slider and is generated mainly in the front region and the rear region.

When the air density is lowered, the levitation pressure generated on a positive pressure surface is lowered and the overall levitation distance is lowered. The front region is lowered from the rear positive pressure surface and the pitch angle is reduced to suppress the shrinkage of the magnetic function unit located more rearwards than the rear positive pressure surface.

In a preferred embodiment, it is preferable that the area of the rear positive pressure surface is smaller than that of the front positive pressure surface.

The rear region includes a negative pressure generating surface that is farther from the recording medium than the rear positive pressure surface and is nearer to the recording medium than the concave bottom surface than the rear positive pressure surface in both left and right sides of at least a part of the rear positive pressure surface. A dam surface is nearer to the recording medium than the negative pressure generating surface being provided in front of the negative pressure generating surface.

Since the negative pressure generating surface portions are provided in both left and right sides of the rear positive pressure surface, when the air density is lowered, the levitation pressure generated in the rear positive pressure surface is lowered and the negative pressure on the negative pressure generating surface in both sides thereof is also lowered. The balance of the levitation pressure and the negative pressure is planned to suppress the lowering of the levitation distance in a part having the rear positive pressure surface. In the slider, the leading side drops from in both the vicinities of the rear positive pressure and the pitch angle decreases, thus the lowering of the shrinkage of the trailing end portion can be furthermore suppressed.

The dam surface is located coplanarly with the rear positive pressure surface. Alternatively, the dam surface may be located at a height different from the rear positive pressure surface.

The rear positive pressure surface can have a main rear positive pressure surface located on a central line horizontally dividing a slider into two and a sub rear positive pressure surface located in both left and right sides thereof. It is preferable that the area of each sub rear positive pressure surface is smaller than that of the main rear positive pressure surface.

The sub rear positive pressure surface is provided in both the left and right sides, so that the variation of the attitude of the slider to a roll direction can be suppressed when the air density is lowered.

It is preferable that the rear region includes a second rear positive pressure surface located coplanarly with the rear positive pressure surface in the rear of the retreating surface and the area of the second rear positive pressure surface is smaller than that of the rear positive pressure surface.

Each width-direction center of the rear positive pressure surface and the second rear positive pressure surface is located on the function reference line assuming that a virtual line passing through a center of the magnetic function unit and extending in an anteroposterior direction is the function reference line.

The second rear positive pressure surface that has a small area is formed in the trailing end portion of the rear region and the levitation-direction force can be given to the trailing end face that has the magnetic function unit from the vicinity of the rear positive pressure surface, thus the lowering can be furthermore suppressed.

It is preferable that a step surface that is farther from a recording medium than a rear positive pressure surface and is nearer to the recording medium than the concave bottom surface is formed in front of the rear positive pressure surface.

The step surface is formed between the concave bottom surface of the middle region and the rear positive pressure surface. An air stream is led to the rear positive pressure surface from the middle region. The levitation pressure of the rear positive pressure surface can be increased. Thus, the lowering of the levitation distance in the vicinity of the rear positive pressure surface can be suppressed.

The magnetic head device has a low levitation height where the levitation height of the magnetic function unit is lowered can be realized and an extreme lowering of the levitation height of the magnetic function unit can be suppressed. Therefore, when used in an environment having a low air density such as in the mountains or in an aircraft, the levitation height of the magnetic function unit and the recording medium is secured, thus dangerousness such as a damage of the recording medium or a damage of the magnetic function unit can be easily evaded.

DETAILED DESCRIPTION

Figure 1:
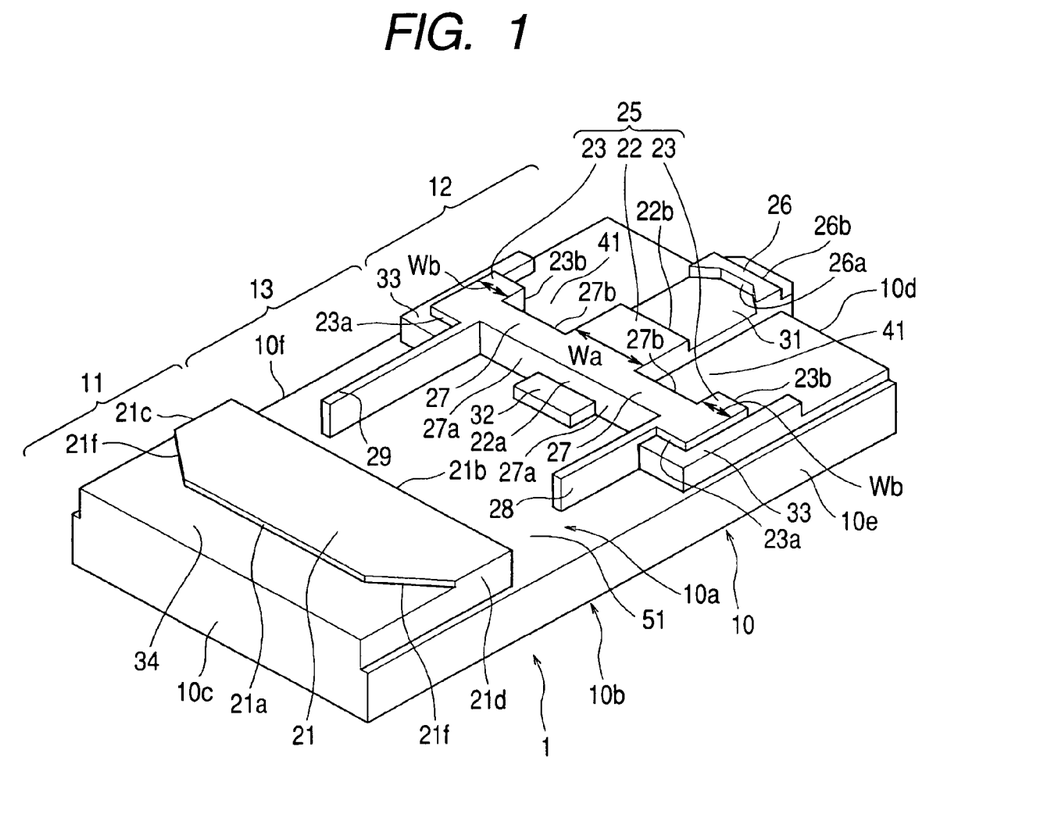
FIG. 1 is a perspective view showing a magnetic head device of a first embodiment upwardly viewed to a facing side.
Figure 2:
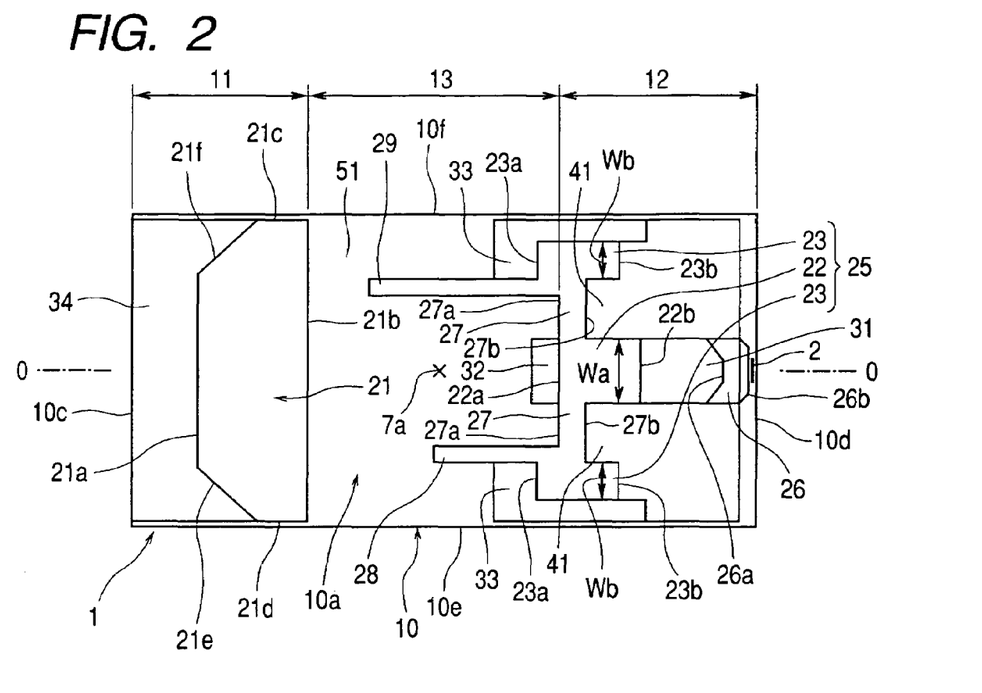
FIG. 2 is a plan view of a magnetic head device of the first embodiment viewed from a facing side thereof.
Figure 3:
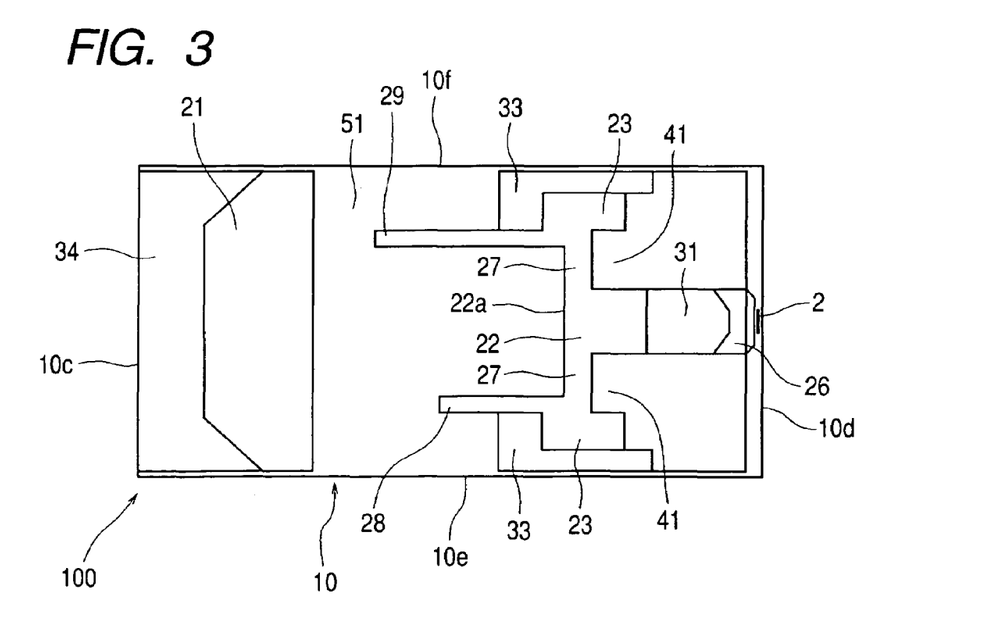
FIG. 3 is a plan view of a magnetic head device of a second embodiment viewed from a facing side thereof.
Figure 4:
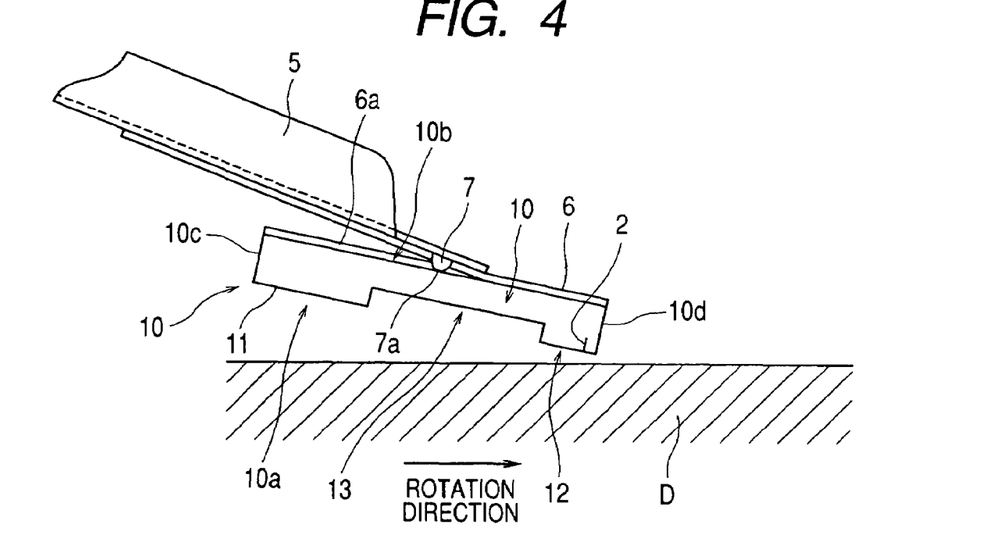
FIG. 4 is a side view showing a supporting device that supports a magnetic head device.
Figure 5:
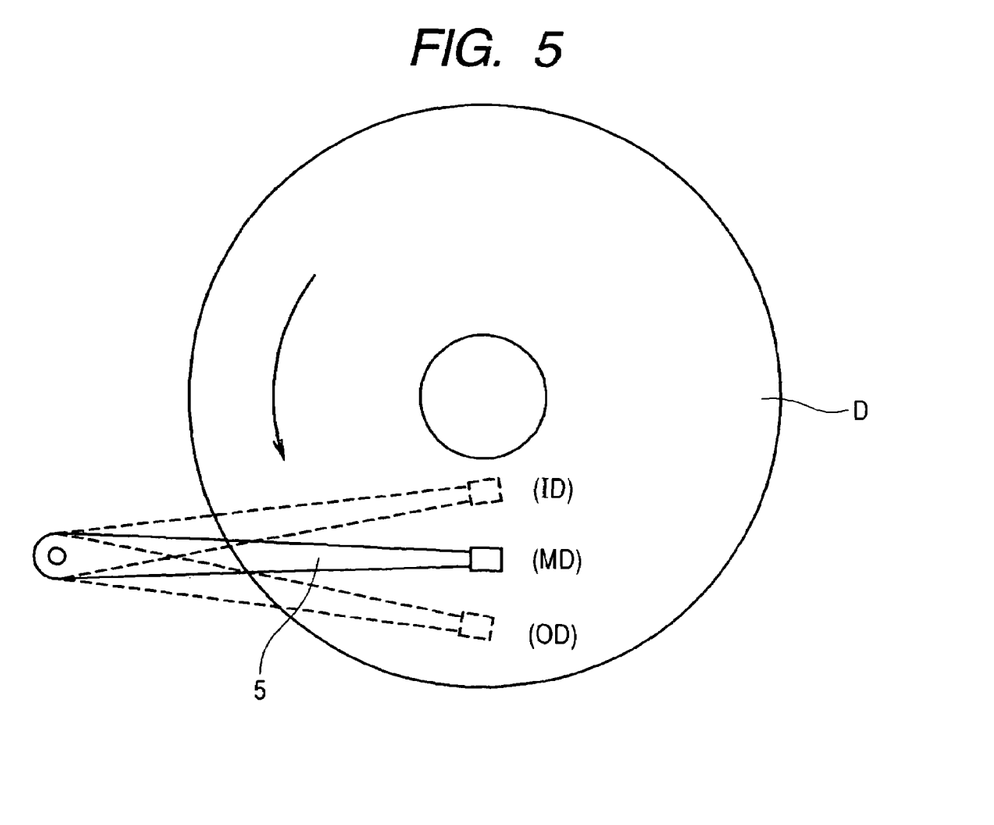
FIG. 5 is a plan view showing a facing position of a recording medium and a magnetic head device.
Figure 6:
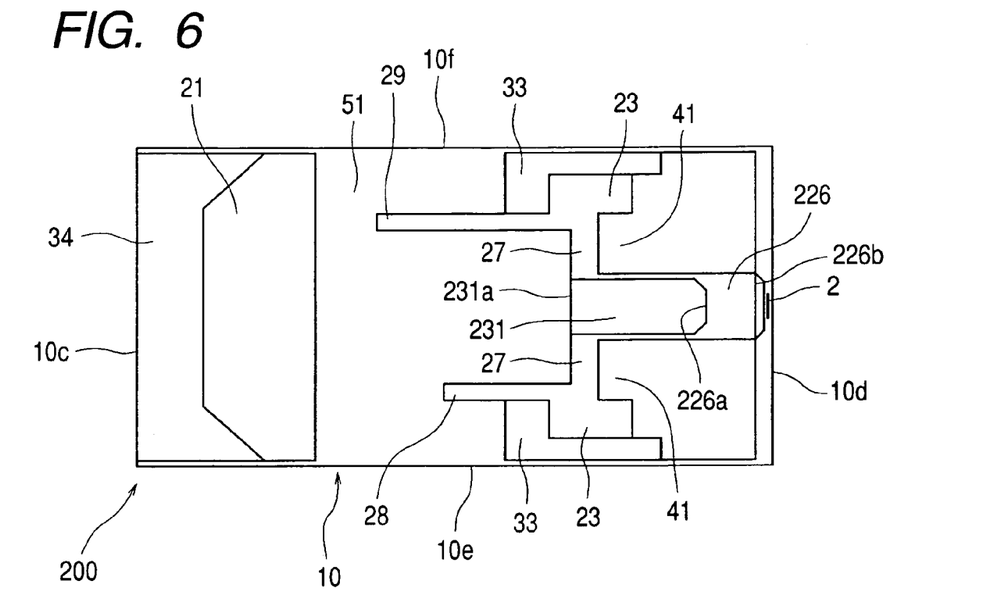
FIG. 6 is a plan view showing a magnetic head device viewed from a first comparative example.
Figure 7:
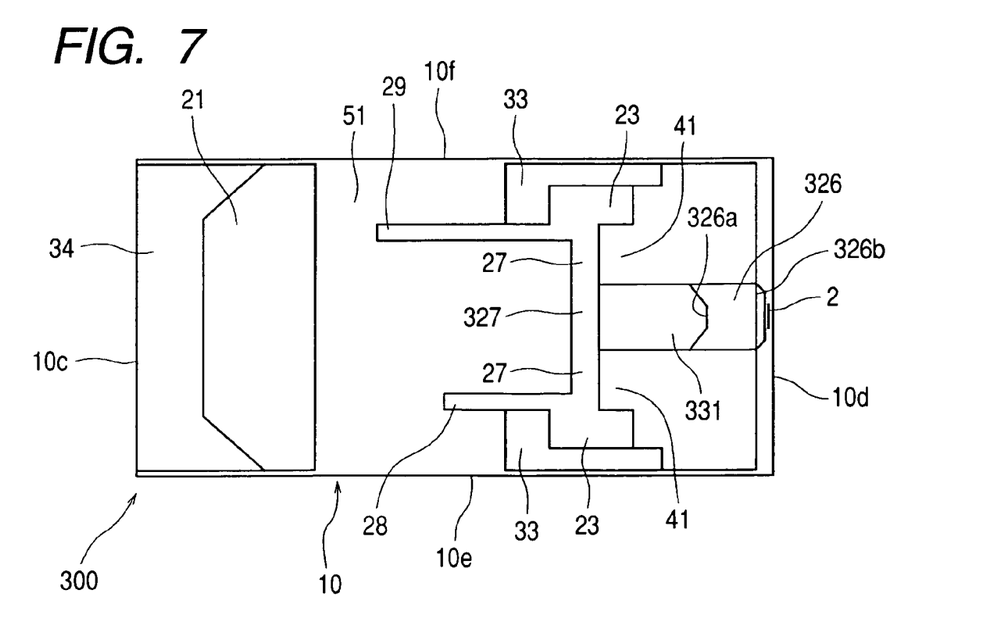
FIG. 7 is a plan view showing a magnetic head device viewed from a second comparative example.
Figure 8:
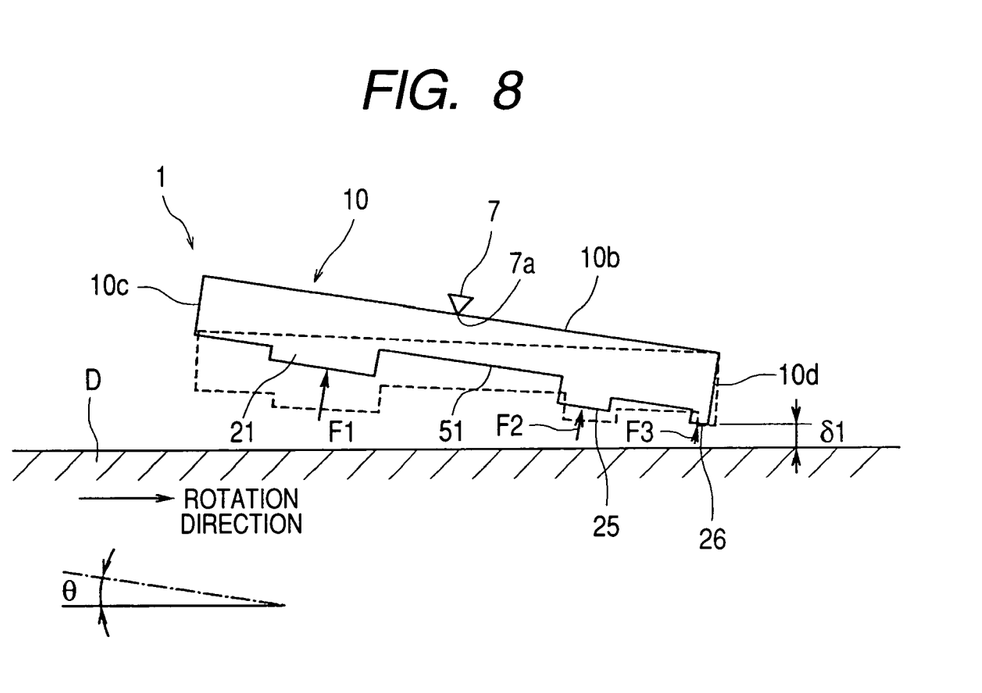
FIG. 8 is a side view showing a levitation attitude of a magnetic head device of the first embodiment.
Figure 9:
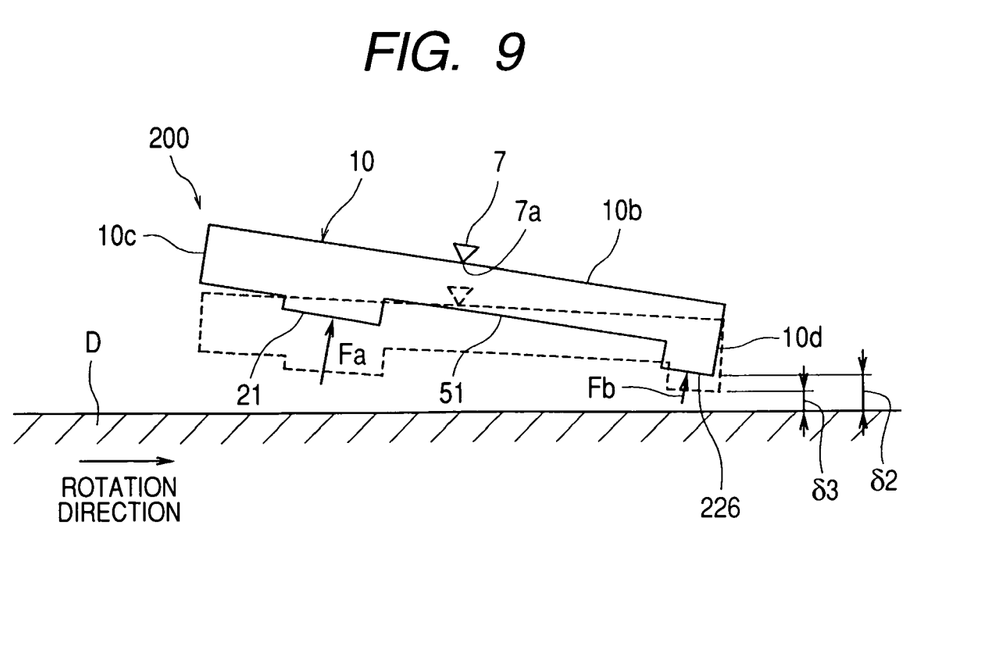
FIG. 9 is a side view showing a levitation attitude of a magnetic head device of the first comparative example.
Figure 10:
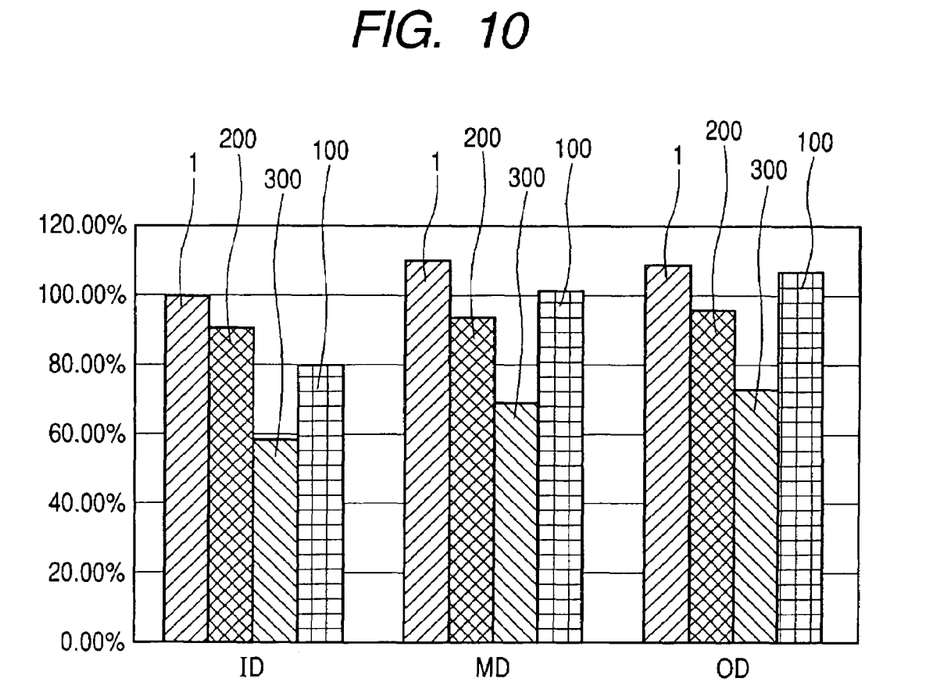
FIG. 10 is a graph simulating the variation of a levitation distance by altitude difference when magnetic head devices of each embodiment and each comparative example are designed.

FIG. 1 is a perspective view showing a magnetic head device of a first embodiment upwardly viewed to a facing side that faces a recording medium. FIG. 2 is a plan view of a magnetic head device of the first embodiment viewed from a facing side thereof. FIG. 3 is a plan view of a magnetic head device of a second embodiment of the present invention viewed from a facing side facing the recording medium. FIG. 4 is a side view showing a supporting device that supports a magnetic head device. FIG. 5 is a plan view showing a facing position of a recording medium and a magnetic head device. FIGS. 6 and 7 are plan views showing magnetic devices which are comparative examples view from a facing side facing a recording medium. FIG. 8 is a schematic view showing the variation of levitation attitude of the magnetic head device of the preferred embodiment of the present invention when air density is changed. FIG. 9 is a schematic view showing the variation of levitation attitude of a magnetic head device which is a comparative example when air density is changed. FIG. 10 is a diagram describing the variation state of a levitation height of the magnetic head device of the preferred embodiments and the magnetic head device which is a comparative example corresponding to the change of air density.

A magnetic head device 1 of a first embodiment shown in FIGS. 1 and 2 has a cubic slider 10 formed of, for example, alumina-titanium carbide and a magnetic function unit 2 loaded on the slider 10.

The magnetic function unit 2 has a reading function unit that reads a magnetic signal recorded in a recording medium D by using magnetoresistance effect (MR effect), great magnetoresistance effect (GMR effect) or tunnel magnetoresistance effect (TMR effect) and a recording function unit which writes the magnetic signal in the recording medium D by forming a york of magnetic material or a coil of conductive material in a thin-film process.

The slider 10 has a facing side 10a that faces the recording medium and a suppression side 10b suitable for a reverse side of the facing side 10a. The slider 10 has a leading end face 10c suitable for an inflow side of an air stream generated on a surface of the recording medium D and a trailing end face 10d which outflows the air stream, and the magnetic function unit 2 is provided in the trailing end face 10d. The slider 10 has a side surface 10e of an inner circumference side directed to a rotation center side of the recording medium D such as a hard disk shown in FIG. 5 and a side surface 10f of an outer circumference side directed to an outer circumference of the recording medium.

A direction toward the leading end face 10c may be referred to as a front and an end portion toward the leading end face 10c may be referred to as a front end. A direction toward the trailing end face 10d may be referred to as a rear and an end portion toward the trailing end face 10d may be referred to as a rear end. A direction parallel to the leading end face 10c and the trailing end face 10d may be referred to as a horizontal direction, and a side toward a side surface 10e of an inner circumference side may be referred to as a left side and a side toward a side surface 10f of an outer circumference side may be referred to as a right side.

In FIG. 2, a virtual line extending in an anteroposterior direction by dividing the leading end face 10c and the trailing end face 10d, is the function reference line O-O. A center of the magnetic function unit 2 is located on the function reference line O-O.

As shown in FIG. 4, a pressing side 10b of the slider 10 that comprises the magnetic head device 1 is supported by a supporting device. A load beam 5 which is an elastic supporting member is provided in this supporting device. An elastic deformation portion is provided in a base portion of this load beam 5 and a suppression force is given to the recording medium D in the slider 10 by an elastic force of this elastic deformation portion. A flexure 6 formed of an elastic plate which is thinner than the load beam 5 and shows a spring characteristic is fixed in a head portion of the load beam 5 and a surface of the suppression side 10b of the slider 10 is adhesively fixed in a supporting piece 6a bent to the flexure 6.

A pivot 7 that protrudes downward is integrally formed in the head portion of the load beam 5 and the pivot 7 abuts on a surface of the suppression side 10b of the slider 10. An elastic pressing force shown by the load beam 5 is concentratively exerted to an abutment point 7a of the pivot and the surface of the suppression side 10b of the slider 10. The supporting piece 6a of the flexure 6 can be deformed in each direction and the slider 10 fixed on the supporting piece 6a can change an attitude thereof from the abutment point 7a with the pivot 7. A main direction of this attitude change is a pitch direction to which the function reference line O-O inclines, and a roll direction which inclines left and right on the function reference line O-O.

In FIG. 2, the abutment point 7a of the pivot 7 and the slider 10 is reflectively shown. This abutment point 7a is located on the function reference line O-O, and substantially in a middle point between the leading end face 10c and the trailing end face 10d.

As shown in FIGS. 1 and 2, the facing side 10a of the slider 10 has a front region 11, a rear region 12, and a middle region 13 in the middle of the front region 11 and the rear region 12. The front region 11 indicates a range of from the leading end face 10c to an intersection point between a rear end 21b of a front positive pressure surface 21 described below and the function reference line O-O. The rear region 12 indicates a range of from an intersection point between a front end 22a of a main rear positive pressure surface 22 described below and the function reference line O-O to the trailing end face 10d. The middle region 13 indicates a range between the intersection point of the rear end 21b of the front positive pressure surface 21 and the function reference line O-O. The intersection point of the front end 22a of the main rear positive pressure surface 22 and the function reference line O-O.

In the facing side 10a of the slider 10, the front positive pressure surface 21 is formed in the front region 11. The front positive pressure surface 21 is a plane located in a side that is the nearest to the recording medium D in the front region 11. The plane is a concept that includes a pure plane where a radius of curvature is infinite and a curved surface where the radius of curvature is very large. The front positive pressure surface 21 has the front end 21a and the rear end 21b, and a left end 21d and a right end 21c. The front end 21a and the rear end 21b have a linear shape perpendicular to the function reference line O-O. The left end 21d coincides with a side surface 10e of an inner circumference side of the slider 10 or is located in the vicinity thereof and the right end 21c coincides with a side surface 10f of an outer circumference side of the slider 10 or is located in the vicinity thereof. A front inclination portion 21e is formed between the front end 21a and the left end 21d. A front inclination portion 21f is formed between the front end 21a and the left end 21c. The rear end 21b of the front positive pressure surface 21, that is, a border of the front region 11 and the middle region 13 is located more toward the front than the abutment point 7a of the pivot 7.

In the rear region 12, the rear positive pressure surface 25 is provided in front thereof. This rear positive pressure surface 25 is a plane located in a side that is the nearest to the recording medium in the rear region 12 and this rear positive pressure surface 25 is located coplanarly with the front positive pressure surface 21.

The rear positive pressure surface 25 has a main rear positive pressure surface 22. Sub rear positive pressure surfaces 23 and 23 are located in both left and right sides. A width size of the main rear positive pressure surface 22 is Wa and a middle point of this width size Wa is located on the function reference line O-O. The main rear positive pressure surface 22 is a region of the front end 22a to the rear end 22b in the range of the width size Wa and has the area where a levitation pressure can be generated by an air stream between the main rear positive pressure surface 22 and the recording medium D. The front end 22a of the main rear positive pressure surface 22 is located in a border of the rear region 12 and the middle region 13. The front end 22a thereof is located more toward the rear than an abutment point 7a with the pivot 7, for example, in the trailing side.

It is preferable that a distance between the rear end 22b of the main rear positive pressure surface 22 and the trailing end face 10d is larger than ⅓ of an anteroposterior length of the rear region 12. In this embodiment, the rear end 22b of the main rear positive pressure surface 22 is located more toward the front than a middle point that divides the rear region 12 into a front and a rear.

Each width size of the sub rear positive pressure surfaces 23 and 23 is Wb. Each sub rear positive pressure surface 23 is a region of the front end 23a to the rear end 23b in the range of the width size Wb and has the area where a levitation pressure can be generated by an air stream between the sub rear positive pressure surface 23 and the recording medium D. The front end 23a of the sub rear positive pressure surface 23 is located more toward the front than the front end 22a of the main rear positive pressure surface 22 and is located within a middle region 13. The rear end 23b of the sub rear positive pressure surface 23 is located more toward the front than the middle point dividing the rear region 12 into a front and a rear.

Each sub rear positive pressure surface 23 is divided left and right from main rear positive pressure surface 22, and is independently located, and the area of one sub rear positive pressure surface 23 is smaller than that of the main rear positive pressure surface 22. A summation of the area of the main rear positive pressure surface 22, and the area of two sub rear positive pressure surfaces 23 and 23 is smaller than that of the front positive pressure surface 21. When air density of an operating environment is lowered and a levitation distance of the slider 10 from the recording medium D is reduced, the rear positive pressure surface 25 serves as a supporting point in case of the variation of a pitch angle of the slider 10 and the main rear positive pressure surface 22 mainly shares such function. The sub rear positive pressure surfaces 23 and 23 located on a left and a right show a function to suppress that an attitude of the slider 10 becomes unstable in a roll direction when the air density is lowered.

In the rear region 12, a second rear positive pressure surface 26 is provided in a location more toward the rear than the main rear positive pressure surface 22. This second rear positive pressure surface 26 is a plane located coplanarly with the front positive pressure surface 21 and the rear positive pressure surface 25. A center of the left and right width size of the second rear positive pressure surface 26 coincides with the function reference line O-O and the left and right width size of the second rear positive pressure surface 26 is the same as the width size Wa of the main rear positive pressure surface 22. The second rear positive pressure surface 26 is located in the vicinity of a magnetic function unit 2 or the magnetic function unit 2 is located in an interior of this second rear positive pressure surface 26. A rear end 26b of the second rear positive pressure surface 26 coincides with the trailing end face 10d or is located in the vicinity of the trailing end face 10d. For example, the rear end 26b substantially coincides with the trailing end face 10d. The area of the second rear positive pressure surface 26 is smaller than that of the main rear positive pressure surface 22 and preferably is smaller than ½ of the area of the main rear positive pressure surface 22.

A rail-shaped retreating surface 31 is formed between the main rear positive pressure surface 22 and the second rear positive pressure surface 26. This retreating surface 31 is a plane formed in a location which is farther from the recording medium 26 than the rear positive pressure surface 25 and the second rear positive pressure surface 26. A left and right width size of this retreating surface 31 agrees with a width size Wa of the main rear positive pressure surface 22 and a width size of the second rear positive pressure surface 26. In the rear region 12, the levitation pressure is generated to the main rear positive pressure surface 22 and the second rear positive pressure surface 26 on the function reference line O-O. The levitation pressure is not substantially generated in the retreating surface 31 therebetween and even if the levitation pressure is generated, the levitation pressure therein is smaller than the levitation pressure generated in the main rear positive pressure surface 22 and the second rear positive pressure surface 26. The front end 26a of the second rear positive pressure surface 26 has a concave shape to be hollowed to the rear. An air stream that moves on the retreating surface 31 can be easily shifted to a surface of the second rear pressure surface 26, and thus the levitation pressure having such value can be easily generated in the second rear positive pressure surface 26 having a small area.

A step surface 32 is formed in front of the main rear positive pressure surface 22. This step surface 32 is a plane located coplanarly with the retreating surface 31. A left and right width size of the step surface 32 is the same as the width size of the main rear positive pressure surface 22 and an anteroposterior length size thereof is shorter than that of the main rear positive pressure surface 22. A concave bottom surface of the middle region 13 is in a location that is farther from the recording medium than the front positive pressure surface 21 and the rear positive pressure surface 25, but the step surface 32 is provided therein, thus an air stream passing within the middle region 13 can be easily led to the surface of the main rear positive pressure surface 22 to generate the levitation pressure in the main rear positive pressure surface 22.

Step surfaces 33 and 33 formed in succession are provided in a front, and both left and right sides of sub rear positive pressure surface 23. The respective step surfaces 33 and 33 are plan surfaces located coplanarly with the step surface 32. These step surfaces 33 and 33 are formed, and thus the air stream shifting within the middle region 13 can be led to a surface of the sub rear positive pressure surfaces 23 and 23 to generate the levitation pressure in the sub rear positive pressure surfaces 23 and 23.

A front step surface 34 is formed in the front region 11. This front step side 34 is formed in front of the front positive pressure surface 21, and in the whole region surrounded by the leading end face 10c, a side surface 10e of the inner circumference side and a side surface 10f of the outer circumference side. The front step surface 34 is a plane located coplanarly with the retreating surface 31, and the step surfaces 32 and 33. Since the front step face 34 that has a large area is formed in front of the front positive pressure surface 21, an air stream can be easily led to the front positive pressure surface 21 from the leading end face 10c of the slider 10 via the front step surface 34. Therefore, when the recording medium D begins to rotate, the leading side of the slider 10 is farther from a surface of the recording medium D in a short time, and thus the slider 10 can be easily shifted in a levitation attitude.

In the rear region 12, negative pressure generating surfaces 41 and 41 are formed in both left and right sides of the main rear positive pressure surface 22. These negative pressure generating surfaces 41 and 41 are planes formed at a height to be farther from the recording medium than the retreating surface 31, and the step surfaces 32 and 33.

Dam surfaces 27 and 27 that connect the main rear positive pressure surface 22, and the sub rear positive pressure surfaces 23 and 23 located in both left and right sides thereof are provided in the rear region 12. These dam surfaces 27 and 27 are formed coplanarly with the main rear positive pressure surface 22, and the sub rear positive pressure surfaces 23 and 23, and in succession each other.

An anteroposterior width size of the dam surfaces 27 and 27 is remarkably shorter than the left and right length size of the main rear positive pressure surface 22, and the sub rear positive pressure surfaces 23 and 23. Front ends 27a and 27a of the dam surfaces 27 and 27 agree with the front end 22a of the main rear positive pressure surface 22, and are located in a border of the middle region 13 and the rear region 12. Rear ends 27b and 27b of the dam surfaces 27 and 27 are located more toward the front than the rear end 22b of the main rear positive pressure surface 22, and the rear ends 23b and 23b of the sub rear positive pressure surfaces 23 and 23. The negative pressure generating surfaces 41 and 41 is parts located directly in the rear of the dam surfaces 27 and 27. Regions located in both left and right sides of the main rear positive pressure surface 22 become main negative pressure generating regions. A region surrounded by the main rear positive pressure surface 22, the sub rear positive pressure surface 23 and the dam surface 27 becomes the largest negative pressure generating region.

In the middle region 13, a deep concave portion that is farther from the recording medium than the front region 11 and the rear region 12, and a concave bottom surface thereof is a plane. The concave bottom surface 51 is in a location that is farther from the recording medium than the negative pressure generating surfaces 41 and 41.

In the middle region 13, guide ribs 28 and 29 that extend in parallel toward a front from both left and right sides of the main rear positive pressure surface 22 are formed. These guide ribs 28 and 29 are parallel to each other and surfaces thereof are located coplanarly with the main rear positive pressure surface 22, and the sub rear positive pressure surfaces 23 and 23. Besides, the guide ribs 28 and 29 are formed in succession in the main rear positive pressure surface 22, and the sub rear positive pressure surfaces 23 and 23. The guide rib 29 in the vicinity of the side surface of 10f the outer circumference side is lengthily formed more toward the front than the guide rib 28 located in the vicinity of the side surface 10e of the inner circumference side. An air stream shifting to the middle region 13 passes between the guide rib 28 and the guide rib 29, and can be easily led to the main rear positive pressure surface 22 from the step surface 32.

FIG. 3 is a plan view showing a magnetic head device 100 of a second embodiment of the present invention. A first comparative example shown in FIG. 6 and a second comparative example shown in FIG. 7 are described for comparing the function of the magnetic head device 1 and the magnetic head device 100.

In the second embodiment, the first comparative example and the second comparative example, same reference numeral is given to a part that has a same structure as the magnetic head device 1 of the first embodiment and the detailed description thereof is omitted.

In the magnetic head device 100 of the second embodiment shown in FIG. 3, the step surface 32 formed in front of the main rear positive pressure surface 22 is removed in the magnetic head device 1 of the first embodiment. The front end 22a of the main rear positive pressure surface 22 stands up perpendicularly from the concave bottom surface 51 of the middle region 13. The other configuration of the magnetic head device 100 is the same as that of the magnetic head device of the first embodiment.

In a magnetic head device 200 of the first comparative example shown in FIG. 6, the main rear positive pressure surface 22 is not formed in the rear region 12 and the area of a second rear positive pressure surface 226 becomes wider. The area of the second rear positive pressure surface 226 is the same as that of the main rear positive pressure surface 22. A retreating surface 231 is formed in front of the second rear positive pressure surface 226. This retreating surface 231 is a plane having the same height as the retreating surface 31 of the first embodiment and a front end 231a of this retreating surface 231 is opened toward the middle region 13.

In a magnetic head device of the second comparative example shown in FIG. 7, a second rear positive pressure surface 326 provided in the rear region 12 is formed in a same area as the second rear positive pressure surface 226 of the first comparative example shown in FIG. 6. A retreating surface 331 is formed in front of the second rear positive pressure surface 326 and the retreating surface 331 is formed at a same height as the retreating surface 231 of the first comparative example. The dam surfaces 27 in both left and right sides, and a connecting surface 327 that connects the dam surfaces 27 are formed in front of this retreating surface 331. This connecting surface 327 is a region where an anteroposterior width size thereof is short and the levitation pressure is scarcely generated.

FIG. 8 typically shows a state that the slider 10 is levitated by means of the rotative operation of the recording medium D, facing the recording medium D that is a hard disk in the magnetic head device of the first embodiment. A solid line, for example, represents a levitation attitude when an air density is comparatively high in the operating environment at 0 m above see level and a broken line represents a levitation attitude when the air density is comparatively low in the operating environment at 10,000 feet above see level (3,048 m).

FIG. 9 shows a levitation attitude of a magnetic head device 200 of the first embodiment. A solid line, for example, represents a levitation attitude when an air density is comparatively high in the operating environment at 0 m above see level and the a broken line represents a levitation attitude when the air density is comparatively low in the operating environment at 10,000 feet above see level (3,048 m). In FIG. 8, a pitch angle of the slider 10 which is in a levitation attitude, that is, an angular degree formed by the function reference line O-O extending parallelly to a surface of the suppression side 10b of the slider 10 is shown in θ.

When the levitation attitude of the slider 10 is described in the magnetic head device 200 of the first comparative example shown in FIG. 9, in a facing surface of the slider 10 of this magnetic head device 200, a concave bottom surface 51 that is significantly farther from the recording medium in the middle region 13, and the levitation pressure and a negative pressure are not substantially generated in the middle region 13. A comparatively large levitation force Fa by the levitation pressure is exerted on the front positive pressure surface 21 located in a front and a comparatively small levitation force Fb by the levitation pressure is exerted on the second rear positive pressure surface 226 provided in the vicinity of the trailing end face 10d. Since the levitation forces Fa and Fb are exerted on a front and a rear of the slider 10 and the levitation force substantially is exerted on the middle region 13, a general levitation distance can be set to be low and the levitation height δ2 from the recording medium D of the magnetic function unit 2 provided in the trailing end face 10 can be set to be comparatively low.

When the operating environment is a highland and the air density is lowered, the levitation force Fa exerted on the front positive pressure surface 21 and the levitation force Fb exerted on the second rear positive pressure surface 226 are lowered together. A lowering rate of this levitation force is higher than that of the front positive pressure surface 21 that has a large levitation distance and smaller than that of the second rear positive pressure surface 226. Therefore, as indicated in a broken line in FIG. 9, the slider 10 goes down toward the trailing end face 10d or the recording medium D by the lowering of the pitch angle θ thereof and the lowering of the levitation force Fb. As a result, the levitation height of the magnetic function unit 2 is comparatively greatly lowered to δ3 from δ2.

In the magnetic head device 1 of the embodiment of the present invention, as shown in FIG. 8, the levitation pressure and the negative pressure are not substantially generated in the middle region 13 having the concave bottom surface 51 and a comparatively large levitation force F1 by the levitation pressure exerted on the front positive pressure surface 21. A levitation force F2 smaller than the levitation force F1 is exerted more toward the rear than the abutment point 7a of the pivot 7 by the levitation pressure generated mainly in the main rear positive pressure surface 22 and the levitation pressure generated in a pair of sub rear positive pressure surfaces 23 and 23. In the slider 10, since the levitation force is not substantially generated in the middle region 13, and the levitation forces F1 and F2 are exerted on front and rear thereof, total levitation distance of the slider 10 can be lowered to be set to be comparatively low the levitation height δ1 of the magnetic function unit 2 with respect to the recording medium D as a comparative example of the first embodiment shown in FIG. 9.

When the air density is lowered due to the use in high altitudes, both the front levitation force F1 and the rear levitation force F2 fall, and a vicinity of the rear positive pressure surface 25 goes down, more specifically, the front positive pressure surface 21 also is going to go down. Then, since the lowering rate of the front positive pressure surface 21 that has a high levitation distance is higher than that of the rear positive pressure surface 25, the front positive pressure surface 25 goes down and the pitch angle θ falls from the vicinity of the rear positive pressure surface 25 in the slider 10. Since the pitch angle θ falls from the vicinity of the rear positive pressure surface 25 in the slider 10, even if the vicinity of the rear positive pressure surface 25 goes down, the lowering of the trailing end face 10d located more toward the rear than the rear positive pressure surface 25 is suppressed. Accordingly, the variation (lowering) of the levitation height δ1 of the magnetic function unit 2 can be controlled to be small.

When the air density is lowered, the leading end face 10c goes down from the vicinity of the second rear positive pressure surface 226 located near the trailing end face 10d by the suppression force exerted on the abutment point 7a located more toward the front than the vicinity of the second rear positive pressure surface 226 in the magnetic head device 200 of the first comparative example shown in FIG. 9. The leading end face 10c goes down from the vicinity of the rear positive pressure surface 25 by the suppression force exerted on the abutment point 7a located more toward the front than the vicinity of the rear positive pressure surface 25 in the magnetic head device 1 of the embodiment shown in FIG. 8. However, in the magnetic head device 1 shown in FIG. 8, since the rear positive pressure surface 25 is located even more toward the front than the trailing end face 10d, the trailing end face 10d that has the magnetic function unit 2 behaves to be raised from the vicinity of the rear positive pressure surface 25.

In the magnetic head device 1, as shown in FIGS. 1 and 2, the negative pressure generating region is provided between both the sub rear positive pressure surfaces 23 and 23 of the main rear positive pressure surface 22. The levitation pressure is generated in the main rear positive pressure surface 22, and the sub rear positive pressure surfaces 23 and 23 by the air stream that passes between the recording medium D and the slider 10, and the negative pressure (the absorption force which is headed to the recording medium) is generated in the negative pressure generating region located in both left and right sides of the main rear positive pressure surface 22. In the magnetic head device 1, the levitation distance in the vicinity of the rear positive pressure surface 25 is set by the balance of the levitation pressure and the negative pressure.

In this embodiment, when the air density is lowered, all the levitation pressure generated in the main rear positive pressure surface 22, the sub rear positive pressure surfaces 23 and 23 falls, while the negative pressure also falls in the negative pressure generating region located in both left and right sides of the main rear positive pressure surface 22. Even if the air density is lowered, the shrinkage of the levitation distance in the vicinity of the rear positive pressure surface 25 is small. Since the levitation force F1 exerted on the front positive pressure surface 21 decreases with the lowering of the air density, in the slider 10, the leading end face 10c largely goes down from the vicinity of the rear positive pressure surface 25 and the pitch angle θ comes to decrease in correspondence with the lowering the air density. With the reduction of this pitch angle θ, a part located more rearwards than the vicinity of the rear positive pressure surface 25 can be raised from the vicinity thereof to substantially prevent the reduction of the levitation height δ1 of the magnetic function unit 2.

In the magnetic head device 1 of the embodiment, the second rear positive pressure surface 26 having a small area is provided in the vicinity of the trailing end face 10d, but the drop of the trailing end face 10d when the air density is lowered can be further suppressed by a slight force F3 exerted on the second rear positive pressure surface 26.

In the rear positive pressure surface 25 of the magnetic head device 1, the sub rear positive pressure surfaces 23 and 23 are provided in both left and right sides of the main rear positive pressure surface 22. Even if the air density was changed, the attitude of the roll direction of the slider 10 in the circumference of the function reference line O-O can be stabilized by the balance of the levitation pressure generated in the sub rear positive pressure surfaces 23 and 23, and the negative pressure generated in the negative pressure generating region located more inward than the sub rear positive pressure surfaces 23 and 23.

The sub rear positive pressure surfaces 23 and 23 are removed, so that the main rear positive pressure surface 22 located on the function reference line O-O may be set to be slightly wider than the magnetic head device 1 of the first embodiment.

In the magnetic head device 100, of the second embodiment shown in FIG. 3, since the step surface 32 is not provided in front of the main rear positive pressure surface 22, a function that leads to the main rear positive pressure surface 22 is slightly lowered. As a result, the variation of the levitation height by the change of the air density grows slightly bigger than that of the magnetic head device 1 of the first embodiment. The coefficient of fluctuation of the levitation height by the change of the air density grows lying height by a change of air density gets further smaller than that of the first comparative example and the second comparative example.

In the magnetic head device 300 of the second comparative embodiment shown in FIG. 7, since the connecting surface 327 is formed in front of the second rear positive pressure surface 326, the air stream that passes within the middle region 13 having the concave bottom surface 51 is intercepted from the connecting surface 327 and cannot be shifted to the second rear positive pressure surface 326. As a result, when the air density is lowered, the levitation force Fb exerted on the second rear positive pressure surface 226 is easy to drop, so that the variation of the levitation height by the change of the air density grows bigger than that of the magnetic head device 200 of the first comparative example.

FIG. 10 shows the simulation of a variation of the levitation distance of the trailing end face 10d when a magnetic head of the first and second embodiments, and the first and second comparative examples are designed in a same overall size.

In a bar graph, 1 corresponds to the first embodiment, 100 to the second embodiment and 200 to the first comparative example. The levitation height from the recording medium of the trailing end face id in the air density that corresponds to the altitude 10,000 feet is displayed by the calculation in the bar graph. A vertical axis, 100% means the levitation height of the trailing end face 10d at 0 mm above sea level.

As shown in FIG. 5, ID indicates the levitation height when the magnetic head device is located in the most inner circumference side of the recording medium D, MD indicates the levitation height when the magnetic head device is located in the middle of the recording medium and OD indicates the levitation height when is located in the most outer circumference side.

From the graph of FIG. 10, it can be understood that the variation of the levitation height of the magnetic head device 1 of the first embodiment and the magnetic head device 100 of the second embodiment is smaller than that of the magnetic head device 200 of the first comparative example and the magnetic head device 300 of the second comparative example in an operating environment where the altitude is 10,000 feet.

What is claimed is:

1. A magnetic head device, comprising:
a slider having a facing side that faces a recording medium and a pressing side that exerts a pressing force on the recording medium; and
a magnetic function unit provided in a trailing side of the slider, and performs at least one of a magnetic recording and a magnetic reproducing,
wherein the face side of the slider has a front region located in a leading side, a rear region located in the trailing side and a middle region located therebetween,
wherein the middle region includes a concave bottom surface that is farther from the recording medium than the front region and the rear region, the front region includes a front positive pressure surface that is near to the recording medium therein, and the rear region includes a rear positive pressure surface that is near to the recording medium therein,
wherein the rear positive pressure surface is located more toward the front than the magnetic function unit and more rearwards than an exerting point of the pressing force, a retreating surface being provided in a side that is farther from the recording medium than the rear positive pressure surface between the rear positive pressure surface and the magnetic function unit,
wherein the rear region includes a negative pressure generating surface that is farther from the recording medium than the rear positive pressure surface and is nearer to the recording medium than the concave bottom surface than the rear positive pressure surface in both left and right sides of at least a part of the rear positive pressure surface, a dam surface nearer to the recording medium than the negative pressure generating surface being provided in front of the negative pressure generating surface, and
wherein the dam surface is located coplanarly with the rear positive pressure surface.

2. The magnetic head device according to claim 1, wherein the area of the rear positive pressure surface is smaller than that of the front positive pressure surface.

3. The magnetic head device according to claim 1, wherein the rear positive pressure surface has a main rear positive pressure surface located on a central line horizontally dividing a slider into two and a sub rear positive pressure surface located in both left and right sides thereof.

4. The magnetic head device according to claim 3, wherein the area of each sub rear positive pressure surface is smaller than that of the main rear positive pressure surface.

5. The magnetic head device according to claim 3, wherein the rear region includes a second rear positive pressure surface located coplanarly with the rear positive pressure surface in the rear of the retreating surface and the area of the second rear positive pressure surface is smaller than that of the rear positive pressure surface.

6. The magnetic head device according to claim 5, wherein a step surface is formed in front of the rear positive pressure surface.

7. The magnetic head device according to claim 6, wherein the step surface is farther from the recording medium than the rear positive pressure surface and nearer to the recording medium than the concave bottom surface.

8. The magnetic head device according to claim 3, wherein a step surface is formed in front of the rear positive pressure surface.

9. The magnetic head device according to claim 8, wherein the step surface is farther from the recording medium than the rear positive pressure surface and nearer to the recording medium than the concave bottom surface.

10. The magnetic head device according to claim 1, wherein the rear region includes a second rear positive pressure surface located coplanarly with the rear positive pressure surface in the rear of the retreating surface and the area of the second rear positive pressure surface is smaller than that of the rear positive pressure surface.

11. The magnetic head device according to claim 10, wherein respective widthwise centers of the rear positive pressure surface and the second rear positive pressure surface are located on a function reference line.

12. The magnetic head device according to claim 11, wherein the function reference line is a virtual line that passes through a center of the magnetic function unit and extends in an anteroposterior direction.

13. The magnetic head device according to claim 10, wherein a step surface is formed in front of the rear positive pressure surface.

14. The magnetic head device according to claim 13, wherein the step surface is farther from the recording medium than the rear positive pressure surface and nearer to the recording medium than the concave bottom surface.

15. The magnetic head device according to claim 1, wherein a step surface is formed in front of the rear positive pressure surface.

16. The magnetic head device according to claim 15, wherein the step surface is farther from a recording medium than the rear positive pressure surface and nearer to the recording medium than the concave bottom surface.

17. The magnetic head device according to claim 1, wherein the retreating surface is nearer to the recording medium than the negative pressure generating surface.

* * * * *